(12) United States Patent
Lorenz et al.

(10) Patent No.: US 6,906,110 B1
(45) Date of Patent: Jun. 14, 2005

(54) METHOD FOR THE PRODUCTION OF POLYURETHANES

(75) Inventors: Reinhard Lorenz, Limburgerhof (DE); Stephan Bauer, Ostercappeln (DE); Dieter Junge, Frankenthal (DE); Eva Baum, Schwarzheide (DE); Kathrin Harre, Dresden (DE); Jörg Erbes, Karlsruhe (DE); Thomas Ostrowski, Castrop-Rauxel (DE); Georg Heinrich Grosch, Bad Dürkheim (DE)

(73) Assignee: BASF Aktiengesellschaft, Ludwigshafen (SE)

( * ) Notice: Subject to any disclaimer, the term of this patent is extended or adjusted under 35 U.S.C. 154(b) by 121 days.

(21) Appl. No.: 10/019,998

(22) PCT Filed: Nov. 4, 2000

(86) PCT No.: PCT/EP00/03229

§ 371 (c)(1),
(2), (4) Date: Oct. 19, 2001

(87) PCT Pub. No.: WO00/63270

PCT Pub. Date: Oct. 26, 2000

(30) Foreign Application Priority Data

Apr. 20, 1999 (DE) .......................................... 199 17 897

(51) Int. Cl.⁷ ............................ C08K 3/10; C08K 3/16; C08K 3/24; C08K 3/26; C08K 5/09
(52) U.S. Cl. .................. 521/106; 252/182.27; 521/119; 521/120; 521/123; 521/124; 521/125; 521/128; 521/130; 521/174; 524/706; 524/729; 524/777; 524/778; 524/787; 524/788; 524/796; 528/48; 528/51; 528/55; 528/56; 528/57; 528/76
(58) Field of Search .................... 252/182.27; 521/106, 521/119, 120, 123, 124, 125, 128, 130, 174; 524/706, 729, 777, 778, 787, 788, 796; 528/48, 51, 55, 56, 57, 76

(56) References Cited

U.S. PATENT DOCUMENTS

| 4,200,701 | A |   | 4/1980  | Wetton et al.    | 525/4   |
|-----------|---|---|---------|------------------|---------|
| 4,521,548 | A | * | 6/1985  | Christen et al.  | 521/167 |
| 5,124,425 | A | * | 6/1992  | Higuchi et al.   | 528/59  |
| 5,266,681 | A | * | 11/1993 | Reisch et al.    | 528/414 |
| 5,357,038 | A |   | 10/1994 | Reisch et al.    | 528/414 |
| 5,605,939 | A |   | 2/1997  | Hager            | 521/137 |
| 5,767,323 | A | * | 6/1998  | Televantos et al.| 568/613 |
| 5,962,749 | A | * | 10/1999 | Parsons et al.   | 568/621 |

FOREIGN PATENT DOCUMENTS

| CA | 2228651    | * | 9/1998  |
|----|------------|---|---------|
| DE | 203734     |   | 11/1983 |
| DE | 203735     |   | 11/1983 |
| EP | 406440     |   | 1/1991  |
| EP | 553848     |   | 8/1993  |
| EP | 1403301 A1 |   | 3/2004  |
| WO | WO94/03519 |   | 2/1994  |
| WO | 97/27236   | * | 7/1997  |

* cited by examiner

*Primary Examiner*—Rabon Sergent
(74) *Attorney, Agent, or Firm*—Fernando A. Borrego; Howard & Howard

(57) ABSTRACT

In a process for producing polyurethanes by reacting at least one polyisocyanate with at least one compound containing at least two hydrogen atoms which are reactive toward isocyanate groups, the compound having at least two active hydrogen atoms which is used is at least one polyether alcohol prepared by addition of alkylene oxides onto H-functional initiator substances by means of multimetal cyanide catalysis and the reaction is carried out in the presence of at least one metal salt.

4 Claims, No Drawings

METHOD FOR THE PRODUCTION OF POLYURETHANES

Polyurethanes are produced in large quantities. An important starting material used for their production is polyether alcohols. The latter are usually prepared by catalytic addition of lower alkylene oxides, in particular ethylene oxide and propylene oxide onto H-functional initiator molecules. The catalysts used are usually basic metal hydroxides or salts, with potassium hydroxide having the greatest industrial importance.

In the synthesis of polyether polyols having long chains and hydroxyl numbers of from about 26 to about 60 mg KOH/g, which are used for producing flexible polyurethane foams in particular, secondary reactions which lead to faults in the chain structure occur as chain growth progressors. These by-products are referred to as unsaturated constituents and lead to impairment of the properties of the resulting polyurethane materials. In particular, these unsaturated constituents, which have an OH-functionality of 1, have the following consequences:

Owing to their sometimes very low molecular weight, they are volatile and thus increase the total content of volatile constituents in the polyether polyol and in the polyurethanes produced therefrom in particular flexible polyurethane foams.

They act as chain terminators in the production of the polyurethane because they retard or reduce the crosslinking of the polyurethane or the buildup of the molecular weight of the polyurethane.

It is therefore very desirable in industry to avoid unsaturated constituents as far as possible.

One way of preparing polyether alcohols having a low content of unsaturated constituents is the use of multimetal cyanide catalysts, usually zinc hexacyanometalates, as alkoxylation catalysts. There is a large number of documents which describe the preparation of polyether alcohols by means of such catalysts. Thus, DD-A-203 735 and DD-A-203 734 describe the preparation of polyether polyols using zinc hexacyanocobaltate. The use of multimetal cyanide catalysts enables the content of unsaturated constituents in the polyether polyol to be reduced to about 0.003–0.009 meq/g; in the case of conventional catalysis using potassium hydroxide, about 10 times these amounts are found (about 0.03–0.08 meq/g).

The preparation of the zinc hexacyanometalates is also known. These catalysts are usually prepared by reacting solutions of metal salts such as zinc chloride with solutions of alkali metal or alkaline earth metal cyanometalates, e.g. potassium hexacyanocobaltate. A water-miscible, heteroatom-containing component is generally added to the resulting suspension immediately after the precipitation. This component can also previously be present in one or both starting solutions. This water-miscible heteroatom-containing component can be, for example, an ether, polyether, alcohol, ketone or mixture thereof. Such processes are described, for example, in U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,404,109, U.S. Pat. No. 3,829,505, U.S. Pat. No. 3,941,849, EP 283,148, EP 385,619, EP 654,302, EP 659,798, EP 665,254, EP 743,093, EP 755,716, EP 862,947, EP 892,002, U.S. Pat. No. 4,843,054, U.S. Pat. No. 4,877,906, U.S. Pat. No. 5,158,922, U.S. Pat. No. 5,426,081, U.S. Pat. No. 5,470,813, U.S. Pat. No. 5,482,908, U.S. Pat. No. 5,498,583, U.S. Pat. No. 5,523,386, U.S. Pat. No. 5,525,565, U.S. Pat. No. 5,545,601, JP 7,308,583, JP 6,248,068, JP 4,351,632 and U.S. Pat. No. 5,545,601.

One problem with the use of polyether alcohols which have been prepared by means of multimetal cyanide catalysts is their lower reactivity compared to other polyether alcohols catalyzed by means of hydroxides. In order to rectify this deficiency, WO 94/03519 proposes adding alkali metal oxides and hydroxides and/or alkaline earth metal oxides and hydroxides in an amount of from 0.5 to 10 ppm to the polyether alcohols prepared by means of multimetal cyanide catalysts after removal of the catalyst.

However, it has been found that polyether alcohols which have been prepared by means of multimetal cyanide catalysts and to which the compounds described in WO 94/03519 have been added cannot be used for producing flexible polyurethane foams. The foams produced in this way have severe cracks running through the entire test specimen. In addition, severe dark-brown discoloration of the foam specimens is observed.

If the addition of metal compounds to polyether alcohols which have been prepared by means of multimetal cyanide catalysts is omitted entirely, their reactivity is, as indicated above, insufficient. Crack formation occurs in many cases. If the amount of catalyst, in particular the amount of tin catalyst, is increased, crack formation can be prevented but the foams are usually closed-celled. The foamability of the polyetherols is regarded by the foam manufacturer as being better if the amount of tin catalysts added to the A component comprising polyols, catalysts, blowing agents and auxiliaries can be varied over as wide as possible a range while at the same time achieving satisfactory open-cellularity, satisfactory mechanical properties and a homogeneous structure of the foam.

It is an object of the present invention to increase the reactivity of polyether alcohols which have been prepared by means of multimetal cyanide catalysts without the above-mentioned disadvantages being encountered in the production of flexible polyurethane foams.

We have found that this object is achieved by adding metal salts to polyether alcohols which have been prepared by means of multimetal cyanide catalysts.

The present invention accordingly provides polyether alcohols which can be prepared by addition of alkylene oxides onto H-functional initiator substances by means of multimetal cyanide catalysts and to which metal salts are added.

The invention further provides a process for producing polyurethanes, in particular flexible polyurethane foams, by reacting isocyanates with compounds containing at least two active hydrogen atoms, wherein the compounds containing at least two active hydrogen atoms which are used are polyetherols which can be prepared by addition of alkylene oxides onto H-functional initiator substances by means of multimetal cyanide catalysts and to which metal salts are added.

The invention also provides polyurethanes, in particular flexible polyurethane foams, which can be prepared by reacting isocyanates with compounds containing at least two active hydrogen atoms, wherein the compounds containing at least two active hydrogen atoms which are used are polyetherols which can be prepared by addition of alkylene oxides onto H-functional initiator substances by means of multimetal cyanide catalysts and the reaction is carried out in the presence of metal salts.

The metal salts used are preferably ones of the formula $M^{(A+)}{}_a X^{(B-)}{}_b$ where M is an alkali metal or alkaline earth metal, an ammonium ion, boron, aluminum or hydrogen and X is an organic or inorganic anion, where
    $A^+$ is the valence of the cation,
    $B^-$ is the valence of the anion and
    a and b are integers,
    with the proviso that the compound is electrically neutral.
Preference is given to using metal salts of the formula $M^{(A+)}{}_a X^{(B-)}{}_b$ in which
$M^{(A+)}$=$Li^+$, $Na^+$, $K^+$, $Rb^+$, $Cs^+$, $NH_4^-$, $Be^{2+}$, $Mg^{2+}$, $Ca^{2+}$, $Sr^{2+}$, $Ba^{2+}$ and
$X^{(B-)}$=$F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_3^{3-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_{n+1}H_{2n-2}O_4)^{2-}$ where n=1–20
and their mixed salts and mixtures, where
    A+ is the valence of the cation,
    B– is the valence of the anion and
    a and b are integers,
with the proviso that the compound is electrically neutral.

Particular preference is given to salts of the formula $M^{(A+)}{}_a X^{(B-)}{}_b$ in which
$M^{(A+)}$=$Li^+$, $Na^+$, $K^+$, $NH_4^+$, $Mg^{2+}$, $Ca^{2-}$, and
$X^{(B-)}$=$F^-$, $Cl^-$, $Br^-$, $I^-$, $NO_3^-$, $HCO_3^-$, $CO_3^{2-}$, $HSO_4^-$, $SO_4^{2-}$, $H_2PO_4^-$, $HPO_4^{2-}$, $PO_4^{3-}$, $(OC_nH_{2n+1})^-$, $(C_nH_{2n-1}O_2)^-$, $(C_{n+1}H_{2n-2}O_4)^{2-}$ where n=1–20
and their mixed salts and mixtures, where
    A+ is the valence of the cation,
    B– is the valence of the anion and
    a and b are integers,
with the proviso that the compound is electrically neutral.

Particular preference is given to potassium salts, in particular potassium chloride, potassium phosphate and potassium acetate. The salts are preferably used in an amount of from 0.5 to 50 ppm, based on the A component. The salts are preferably added to the polyether alcohols and the addition is preferably carried out after the preparation of the polyether alcohols, before or in particular after the purification step for the polyether alcohols. However, it is also possible to add the salts prior to the polyether alcohol synthesis, preferably by addition to the initiator substance. The salts are inert in the preparation of the polyether alcohols. In order to obtain optimum mixing of the salts with the polyether alcohol, they are preferably added as solution. Water can be used as solvent, but it is also possible to first mix the salts with part of the polyether alcohol and then add this mixture to the polyether alcohol.

In a specific embodiment of the invention, the salts can be added to a blowing agent, in particular water. In a further embodiment of the invention, the salts can also be added to a catalyst and/or an auxiliary. In a further embodiment of the invention, the salts can also be added to the isocyanate component.

According to the present invention, the metal salts can also be added to more than one component.

The preparation of the polyether alcohols is carried out, as indicated above, by catalytic addition of alkylene oxides, in particular ethylene oxide, propylene oxide, butylene oxide, vinyloxirane, styrene oxide or mixtures of at least two of the abovementioned alkylene oxides. The use of the catalysts according to the present invention is particularly advantageous in the addition reaction of propylene oxide, ethylene oxide and their mixtures.

Initiator substances used are, as indicated above, H-functional compounds. For preparing the polyether alcohols of the present invention, preference is given to using bifunctional and/or trifunctional alcohols, preferably ethylene glycol, diethylene glycol, propylene glycol, dipropylene glycol, 1,4-butanediol, glycerol, trimethylolpropane, pentaerythritol, water or any mixtures of at least two of the compounds mentioned.

The multimetal cyanide compounds used as catalysts have the formula

$$M^1{}_a[M^2(CN)_b(A)_c]_d \cdot eL \cdot fH_2O \qquad (I),$$

where
$M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2-}$, $Pd^{2-}$, $Pt^{2+}$, $V^{2+}$, $Mg^{2+}$, $Ca^{2+}$, $Ba^{2+}$, $Cu^{2+}$ and mixtures thereof,
$M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3-}$ and $M^1$ and $M^2$ are identical or different,
A is an anion selected from the group consisting of halide, hydroxide, sulfate, carbonate, cyanide, thiocyanate, isocyanate, cyanate, carboxylate, oxalate and nitrate,
L is a water-miscible ligand selected from the group consisting of alcohols, aldehydes, ketones, ethers, polyethers, esters, ureas, amides, nitriles and sulfides,
b, c and d are selected so that the compound is electrically neutral and
e is the number of coordinated ligands and,
f is the number of coordinated water molecules.

The catalysts used can be X-ray-amorphous, as described in EP-A-654,302 or EP-A-743,093. The catalysts can also be X-ray-crystalline with an X-ray diffraction pattern as described in EP-A-755,716.

The catalysts can be prepared either from the alkali metal or alkaline earth metal cyanometallates as described in EP-A-555,053 or from the cyanometalic acids as described in EP-A-862,947.

The catalysts can be used as powder or as pastes. The use of pastes is described in WO 97/26,080.

It is also possible to use catalysts in which the multimetal cyanide compounds are applied to or introduced into inert organic and/or inorganic supports or shaped to form catalyst-containing shaped bodies.

The molecular addition of the alkylene oxides is carried out under the customary conditions at from 60 to 180° C., preferably from 90 to 140° C., in particular from 100 to 130° C., and pressures in the range from 0 to 15 bar, preferably in the range from 0 to 10 bar and in particular in the range from 0 to 5 bar. The initiator substance/DMC mixture can be pretreated by stripping before commencement of the alkoxylation, as taught in WO 98/52,689.

After the molecular addition of the alkylene oxides is complete, the polyether alcohol is worked up according to customary methods by removing the unreacted alkylene oxides and volatile constituents, usually by distillation, steam stripping or gas stripping and/or other methods of deodorization. If necessary, a filtration can also be carried out.

The catalyst can be deactivated and/or removed from the polyol. Usually, the catalyst is, if desired with the help of filter aids, filtered off and/or centrifuged off.

As indicated above, the polyether alcohols of the present invention are preferably reacted with polyisocyanates to produce polyurethanes, preferably polyurethane foams and thermoplastic polyurethanes, in particular flexible polyurethane foams. In this reaction, the polyether alcohols of the present invention can be used individually or in admixture with other compounds containing at least two active hydrogen atoms.

Polyisocyanates used here can be any isocyanates having two or more isocyanate groups in the molecule. It is possible to use either aliphatic isocyanates such as hexamethylenediisocyanate (HDI) or isophorone diisocyanate (IPDI), or preferably aromatic isocyanates, such as tolylene diisocyanate (TDI), diphenylmethane diisocyanate (MDI) or mixtures of diphenylmethane diisocyanate and polyphenylpolymethylene polyisocyanates (crude MDI). It is also possible to use isocyanates which have been modified by incorporation of urethane, uretdione, isocyanurate, allophanate, uretonimine and other groups, known as modified isocyanates.

As compounds containing at least two groups which are reactive toward isocyanate groups, which are used in admixture with the polyether alcohols of the present invention, it is possible to use amines and mercaptans, but preferably polyols. Among the polyols, polyether polyols and polyester polyols have the greatest industrial importance. The polyether polyols used for producing polyurethanes are usually prepared by base-catalyzed addition of alkylene oxides, in particular ethylene oxide and/or propylene oxide, onto H-functional initiator substances. Polyester polyols are usually prepared by esterification of polyfunctional carboxylic acids with polyfunctional alcohols. The compounds containing at least two groups which are reactive toward isocyanates also include chain extenders and/or crosslinkers which can also be used if desired. These are at least bifunctional amines and/or alcohols having molecular weights in the range from 60 to 400.

As blowing agents, use is usually made of water and compounds which are gaseous at the temperature of the urethane reaction and are inert toward the starting materials for the polyurethanes, known as physically active blowing agents, and also mixtures thereof. Physically acting blowing agents used are hydrocarbons having from 2 to 6 carbon atoms, halogenated hydrocarbons having from 2 to 6 carbon atoms, ketones, acetals, ethers and inert gases such as carbon dioxide or noble gases.

Catalysts used are, in particular, amine compounds and/or metal compounds, in particular heavy metal salts and/or organic metal compounds. Particular preference is given to using known tertiary amines and/or organic metal compounds as catalysts. Suitable organic metal compounds are, for example, tin compounds such as tin(II) salts of organic carboxylic acids, e.g. tin(II) acetate, tin(II) octoate, tin(II) ethylhexanoate and tin(II) laurate, and the dialkyl tin(IV) salts of organic carboxylic acids, e.g. dibutyltin diacetate, dibutyltin dilaurate, dibutyltin maleate and dioctyltin diacetate. Examples of organic amines which are customary for this purpose are: triethylamine, 1,4-diazabicyclo[2.2.2]octane, tributylamine, dimethylbenzylamine, N,N,N',N'-tetramethylethylenediamine, N,N,N',N'-tetramethylbutanediamine, N,N,N',N'-tetramethylhexane-1,6-diamine, dimethylcyclohexylamine, pentamethyldipropylenetriamine, pentamethyldiethylenetriamine, 3-methyl-6-dimethylamino-3-azapentol, dimethylaminopropylamine, 1,3-bis(dimethylamino)butane, bis(2-dimethylaminoethyl)ether, N-ethylmorpholine, N-methylmorpholine, N-cyclohexylmorpholine, 2-dimethylaminoethoxy ethanol, dimethylethanolamine, tetramethylhexamethylenediamine, dimethylamino-N-methylethanolamine, N-methylimidazole, N-formyl-N,N'-dimethylbutylenediamine, N-dimethylaminoethylmorpholine, 3,3'-bis(dimethylamino) di-n-propylamine and/or bis(2-piperazinoisopropyl)ether, diazabicyclo[2.2.2]octane, dimethylpiperazine, N,N'-bis(3-aminopropyl)ethylenediamine and/or tris(N,N-dimethylaminopropyl)-s-hexahydrotriazine, 4-chloro-2,5-dimethyl-1-(N-methylaminoethyl)-imidazole, 2-aminopropyl-4,5-dimethoxy-1-methylimidazole,1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole, preferably 1,4-diazabicyclo[2.2.2]octane and/or imidazoles, particularly preferably 1-(3-aminopropyl)imidazole, 1-(3-aminopropyl)-2-methylimidazole and/or 1,4-diazabicyclo[2.2.2]octane. The catalyst described can be used individually or in the form of mixtures.

Auxiliaries and/or additives used are, for example, mold release agents, flame retardants, colorants, fillers and/or reinforcing materials.

It is customary in industry to combine all starting materials with the exception of the polyisocyanates to form a polyol component and to react this with the polyisocyanates to give the polyurethanes.

The polyurethanes can be produced by the one-shot method or by the prepolymer method. The flexible polyurethane foams can be either slabstock foams or molded foams.

An overview of the starting materials for producing polyurethanes and the processes employed for this purpose may be found, for example, in Kunststoffhandbuch, Volume 7 "Polyurethane", Carl-Hanser-Verlag Munich Vienna, 1st Edition 1966, 2nd Edition 1983 and 3rd Edition 1993.

Surprisingly, the flexible foams produced in the presence of salts from the DMC-catalyzed polyether alcohols display a significantly improved curing behavior, without crack formation, compared to those to which no additives have been added.

Polyether alcohols to which hydroxides have been added as per the process described in WO 94/03519 cannot be processed to give flexible polyurethane foams. The foam produced in this way has severe cracks running through the entire test specimen. In addition, severe dark-brown discoloration occurs.

In contrast, the polyether alcohols of the present invention can be processed to give flexible polyurethane foams having a high open-cellularity or high air permeability and a defect-free foam structure without crack formation.

The invention is illustrated by the examples below.

EXAMPLE 1

Preparation of the catalyst 7 l of strong acid ion exchanger in the sodium form (Amberlite 252 Na, Rohm&Haas) are introduced into an ion exchange column (length 1 m, volume 7.7 l). The ion exchanger is subsequently converted into the H-form by passing 10% strength hydrochloric acid through the ion exchange column for 9 hours at a flow rate of 2 bed volumes per hour until the Na content of the eluate is less than 1 ppm. The ion exchanger is subsequently washed with water until neutral.

The regenerated ion exchanger is then used to prepare an essentially alkali-free hexacyanocobaltic acid ($H_3[Co(CN)_6]$). For this purpose, a 0.24 M solution of potassium hexacyanocobaltate ($K_3[Co(CN)_6]$) in water is passed over the ion exchanger at a flow rate of 1 bed volume per hour. Alter 2.5 bed volumes, the potassium hexacyanocobaltate solution is replaced by water. The 2.5 bed volumes obtained have, on average, a hexacyanocobaltic acid content of 4.5% by weight and an alkali metal content of less than 1 ppm.

2000 ml of an aqueous hexacyanocobaltic acid solution (4.4% by weight of $H_3[Co(CN)_6]$, K content<1 ppm) are heated to 40° C. and subsequently admixed while stirring (blade stirrer, 500 rpm) with a solution of 178.8 g of zinc(II) acetate dihydrate in 600 g of water. 350 g of tert-butanol are subsequently added to the suspension. The suspension is stirred at 40° C. for another 30 minutes. The solid is then filtered off with suction and washed on the filter with 2000 ml of tert-butanol. The solid which had been treated in this way was dried under reduced pressure at 50° C. for 16 hours.

The X-ray diffraction pattern of the double metal cyanide obtained in this way indicated a monoclinic structure.

EXAMPLE 2

Preparation of the polyether alcohol

In the following example, the initiator substance used was a oligopropylene-glycerol having a hydroxyl number of 370 mg KOH/g which had been obtained by an alkali-catalyzed reaction of glycerol with propylene oxide at 105° C. The hydroxyl number was determined in accordance with ASTM D 2849.

605 g of the oligopropylene-glycerol were mixed with 2.14 g of the catalyst from Example 1 under a nitrogen atmosphere in a stirring autoclave. After evacuation of the autoclave, a mixture of 20 g of ethylene oxide and 130 g of propylene oxide was metered in at 125° C. The almost immediate commencement of the reaction was recognized by an only brief pressure rise to 2.5 bar which was followed by an immediate pressure drop. After 10 minutes no free propylene oxide or ethylene oxide remained in the reactor. A mixture of 565.5 g of ethylene oxide and 3690 g of propylene oxide was then fed in at the same temperature at such a rate that a pressure of 2.6 bar abs. was not exceeded. The metering-in phase was complete after only 100 minutes and after a further 20 minutes the reaction phase was complete, as could be seen from the pressure signal.

The polyetherol obtained in this way was filtered once using a deep-bed filter. The polyol had a hydroxyl number of 48 mg KOH/g, a viscosity at 25° C. of 632 mPa•s, a content of unsaturated constituents of 0.0044 meq/g, a zinc content of 23 ppm and a cobalt content of 11 ppm.

EXAMPLES 3–7

Production of the polyisocyanate polyaddition products

Polyol A: Polyether alcohol as described in Example 2
Polyol B: 1 g of a 33% strength aqueous potassium hydroxide solution was mixed with 100 g of polyol A.
Polyol C: 1 g of a 33% strength aqueous potassium phosphate solution was mixed with 100 g of polyol A.
Lupragen® N201: 1,4-diazabicyclo[2.2.2]octane (33%) in dipropylene glycol (67%), (BASF Aktiengesellschaft)
Lupragen® N206: bis-(2-dimethylaminoethyl)ether (70%) in dipropylene glycol (30%), (BASF Aktiengesellschaft)
Kosmus® 29: Tin(II) salt of ethylhexanoic acid, (Goldschmidt AG)
Tegostab® BF 2370: Silicone stabilizer (Goldschmidt AG)
Lupranat® T80: 2,4-/2,6-tolylene diisocyanate mixture (BASF Aktiengesellschaft)

The abovementioned starting materials were reacted in the ratios indicated in Table 1.

All components apart from the isocyanate Lupranat® T80 A were first combined by intensive mixing to form a polyol component. The Lupranat® T80 A was then added while stirring and the reaction mixture was poured into an open mold in which it foamed to give a polyurethane foam. The data for the foams obtained are shown in Table 2.

TABLE 1

| Example | 3 | 4 | 5 | 6 |
| --- | --- | --- | --- | --- |
| Polyol A [g] | 1000 | 999 | 999 | 999 |
| Polyol B [g] | — | 1 | — | — |
| Polyol C [g] | — | — | 1 | — |
| BF 2370 [g] | 10 | 10 | 10 | 10 |
| N201/206 3:1 [g] | 2 | 2 | 2 | 2 |
| K 29 [g] | 3.4 | 3.4 | 3.4 | 3.4 |
| Water [g] | 45 | 45 | 45 | 45 |
| T 80 [g] | 487.46 | 487.46 | 487.46 | 487.46 |
| Index | 110 | | | |

TABLE 2

| Example | 3 | 4 | 5 | 6 |
| --- | --- | --- | --- | --- |
| Cream time [s] | 11 | — | 10 | 12 |
| Fiber time [s] | 75 | — | 80 | 90 |
| Rise time [s] | 80 | — | 85 | 95 |
| Rise height [mm] | 285 | — | 285 | 270 |
| Rise height after 5 min [mm] | 270 | — | 280 | 265 |
| Air permeability [mmWS] | 400 | — | 350 | 25 |
| Appearance of the foam | Crack formation | Unusable foam | Homogeneous, fine-celled | Homogeneous, fine-celled |

We claim:

1. A process for producing polyurethanes comprising reacting at least one polyisocyanate with at least one compound containing at least two hydrogen atoms which are reactive toward isocyanate groups, wherein the compound containing at least two active hydrogen atoms comprises at least one polyether alcohol prepared by addition of alkylene oxides onto H-functional initiator substances by means of multimetal cyanide catalysis and wherein the reaction of the alkylene oxides onto the H-functional initiator substances is carried out in the presence of at least one metal salt of the formula $M^{(A+)}_a X^{(B-)}_b$, where M is selected from at least one of $Li^+$, $Na^+$, $K^+$, $Rb^+$, $Cs^+$, $Be^{2+}$, $Mg^{2+}$, $Ca^{2+}$, $Sr^{2+}$, and $Ba^{2+}$, X is selected from at least one of $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_3^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(C_nH_{2n-1}O_2)^-$, $(C_{n+1}H_{2n-2}O_4)^{2-}$ where n=1–20 and their mixed salts and mixtures, $A^+$ is the valence of the cation, $B^-$ is the valence of the anion and a and b are integers, with the proviso that the metal salt is electrically neutral.

2. A process as claimed in claim 1, wherein the metal salt $M^{(A+)}_a X^{(B-)}_b$ is selected such that:

$M^{(A+)}$=$Li^+$, $Na^+$, $K^+$, $Mg^{2+}$, or $Ca^{2+}$, and $X^{(B-)}$=$F^-$, $Cl^-$, $Br^-$, $I^-$, $NO_3^-$, $HCO_3^-$, $CO_3^{2-}$, $HSO_4^-$, $SO_4^{2-}$; $H_2PO_4^-$, $HPO_4^{2-}$, $PO_4^{3-}$, $(C_nH_{2n-1}O_2)$, or $(C_{n+1}H_{2n-2}O_4)^{2-}$ where n=1–20 and their mixed salts and mixtures, where $A^+$ is the valence of the cation, $B^-$ is the valence of the anion and a and b are integers, with the proviso that the metal salt is electrically neutral.

3. A process as claimed in claim 1 or 2, wherein the metal salt is used in an amount of from 0.1 to 50 ppm, based on the compound having at least two active hydrogen atoms.

4. A flexible polyurethane foam produced according to any one of the processes as claimed in claim 1 or 2.

* * * * *